Oct. 28, 1947.                G. A. DUNN                2,429,749
          MACHINE FOR PARING, CORING, AND HALVING PEARS
          Original Filed Sept. 9, 1940    15 Sheets-Sheet 2

Oct. 28, 1947. G. A. DUNN 2,429,749
MACHINE FOR PARING, CORING, AND HALVING PEARS
Original Filed Sept. 9, 1940 15 Sheets-Sheet 3

Inventor
Guy A. Dunn

Lyon & Lyon
Attorneys

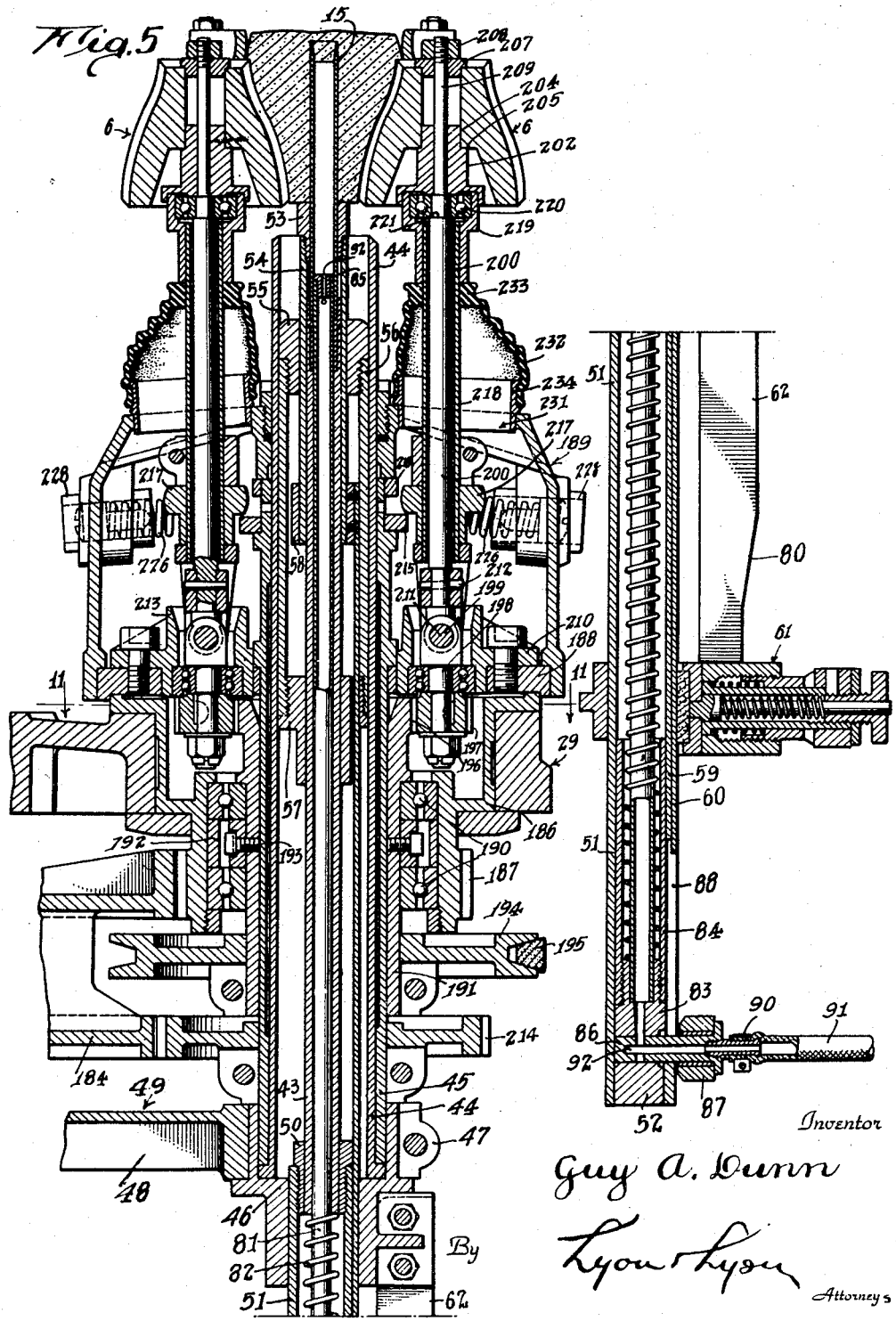

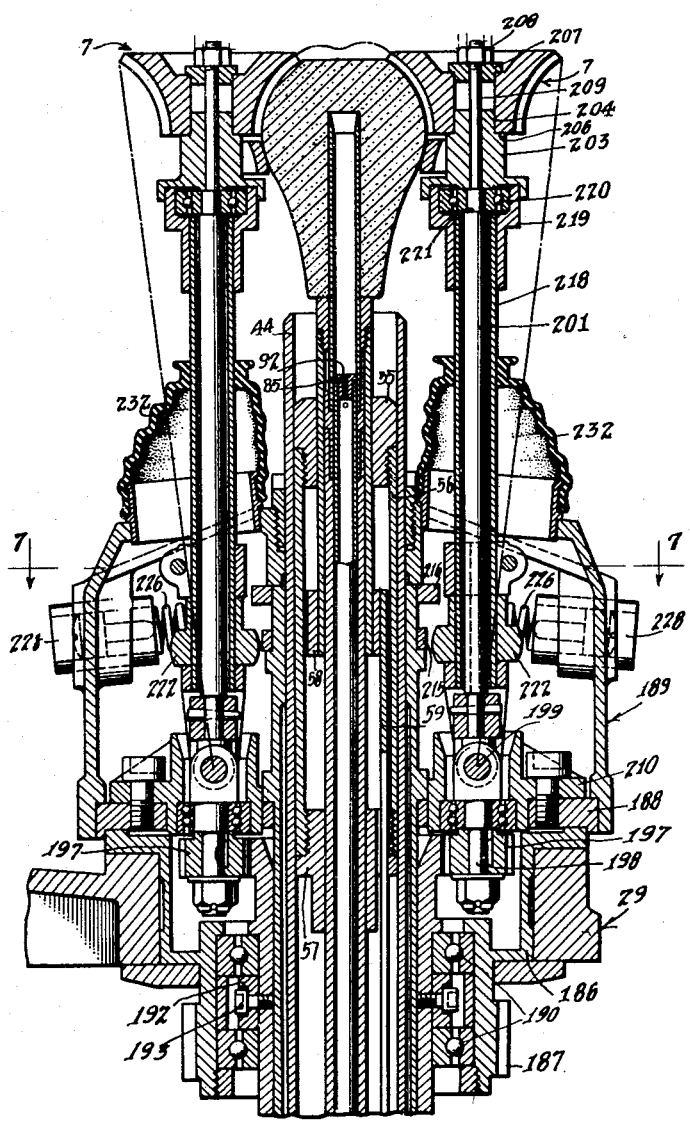

Oct. 28, 1947.    G. A. DUNN    2,429,749
MACHINE FOR PARING, CORING, AND HALVING PEARS
Original Filed Sept. 9, 1940    15 Sheets-Sheet 6
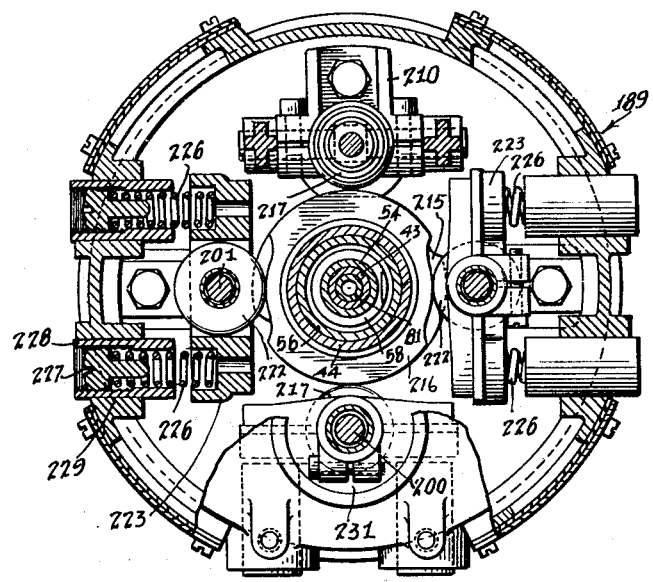
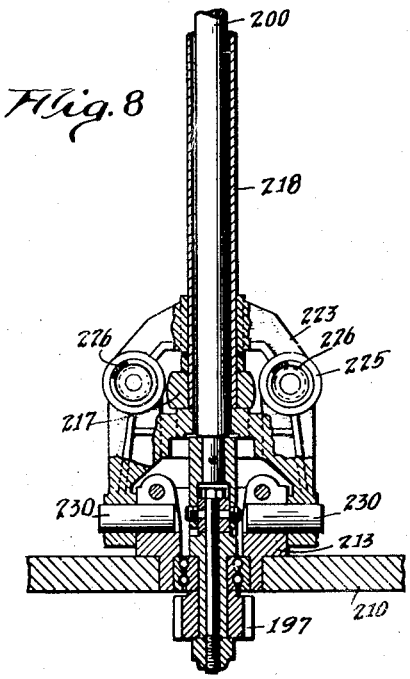
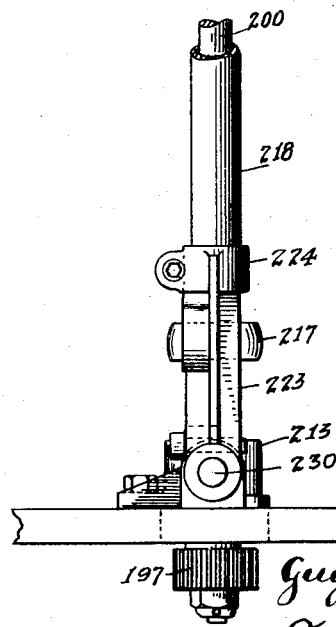
Inventor
Guy A. Dunn
Lyon & Lyon
By    Attorneys Oct. 28, 1947.　　　　G. A. DUNN　　　　2,429,749
MACHINE FOR PARING, CORING, AND HALVING PEARS
Original Filed Sept. 9, 1940　　15 Sheets-Sheet 7
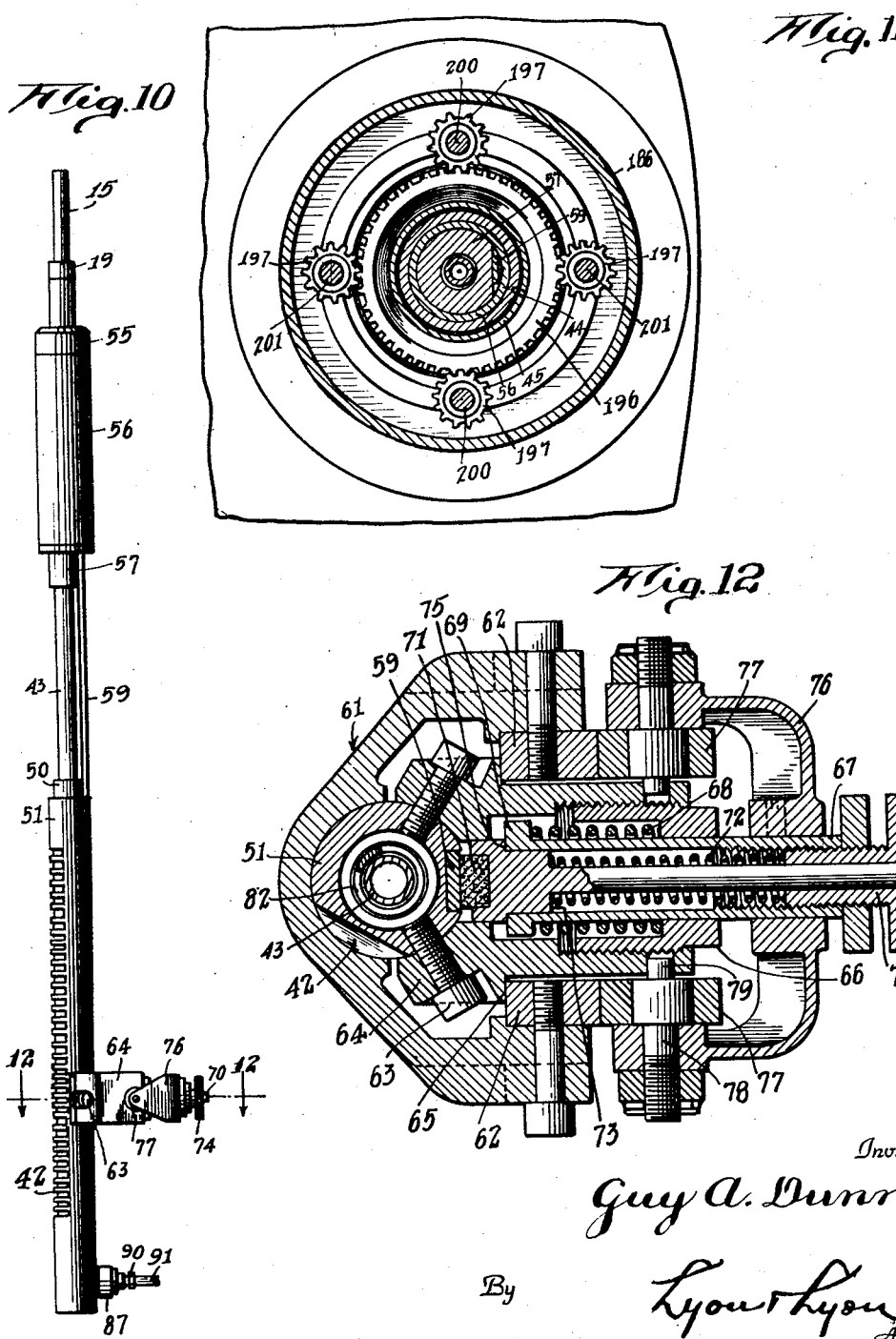

Oct. 28, 1947.  G. A. DUNN  2,429,749
MACHINE FOR PARING, CORING, AND HALVING PEARS
Original Filed Sept. 9, 1940  15 Sheets-Sheet 8
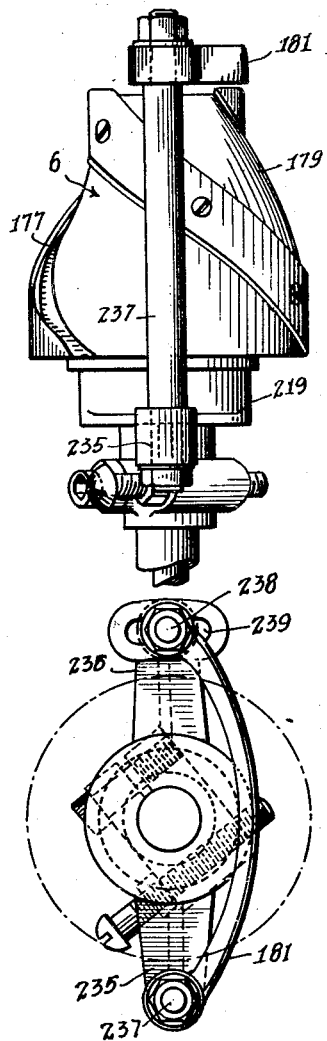
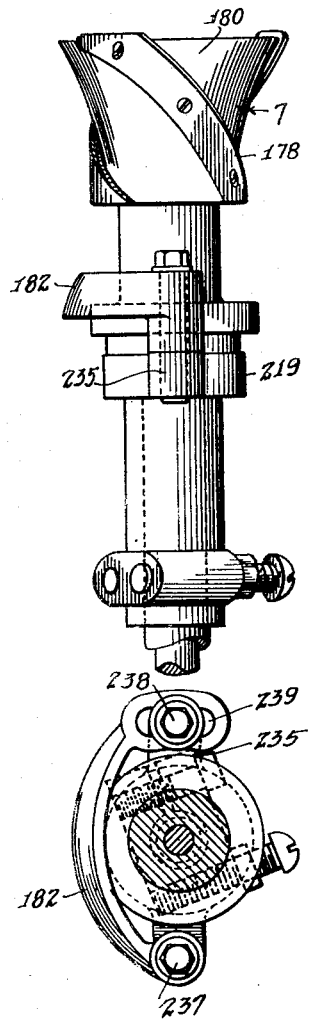
Inventor
Guy A. Dunn
By Lyon & Lyon
Attorneys Oct. 28, 1947.　　　G. A. DUNN　　　2,429,749
MACHINE FOR PARING, CORING, AND HALVING PEARS
Original Filed Sept. 9, 1940　　15 Sheets-Sheet 10
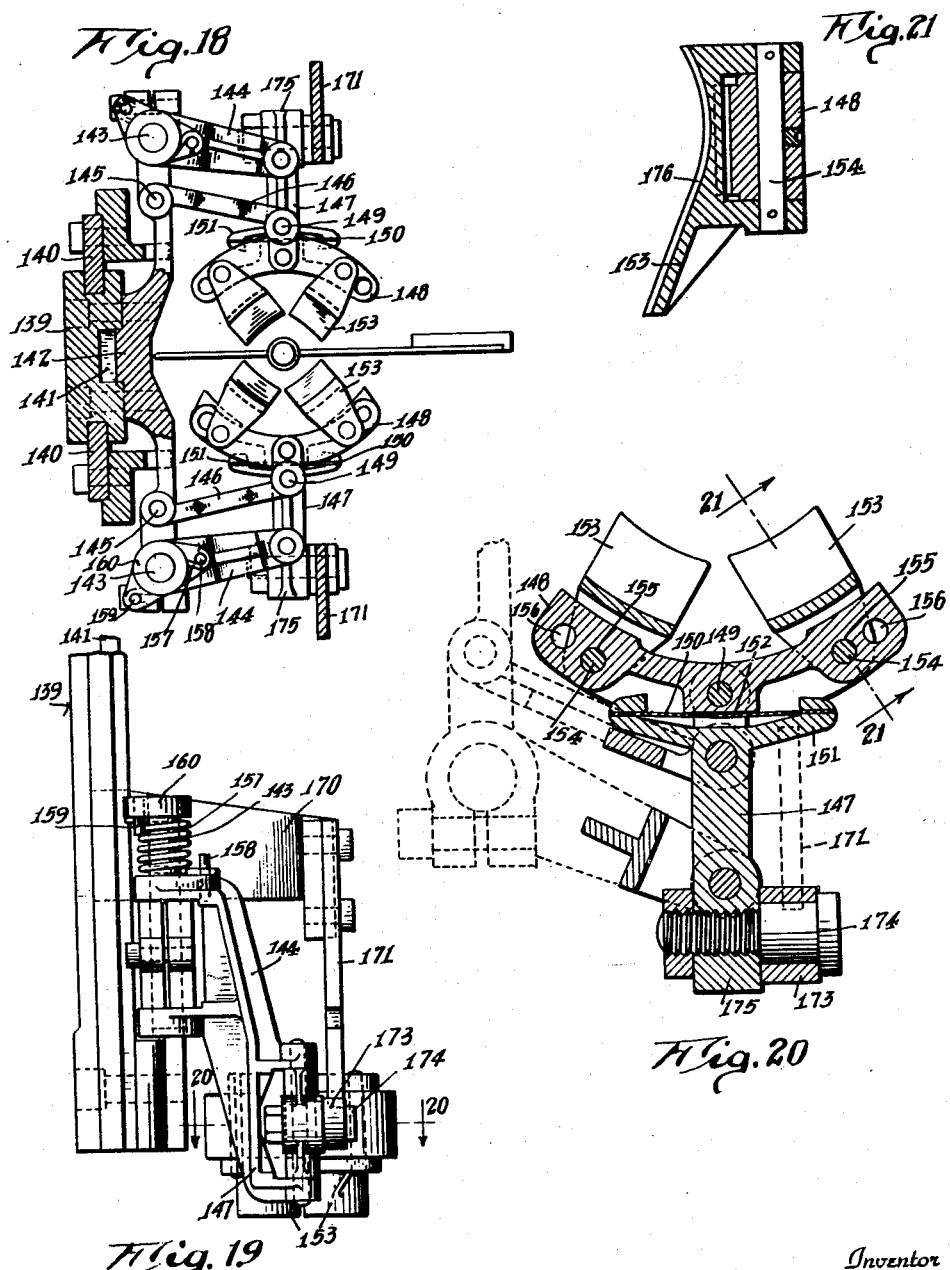
Inventor
Guy A. Dunn
By Lyon & Lyon
Attorneys

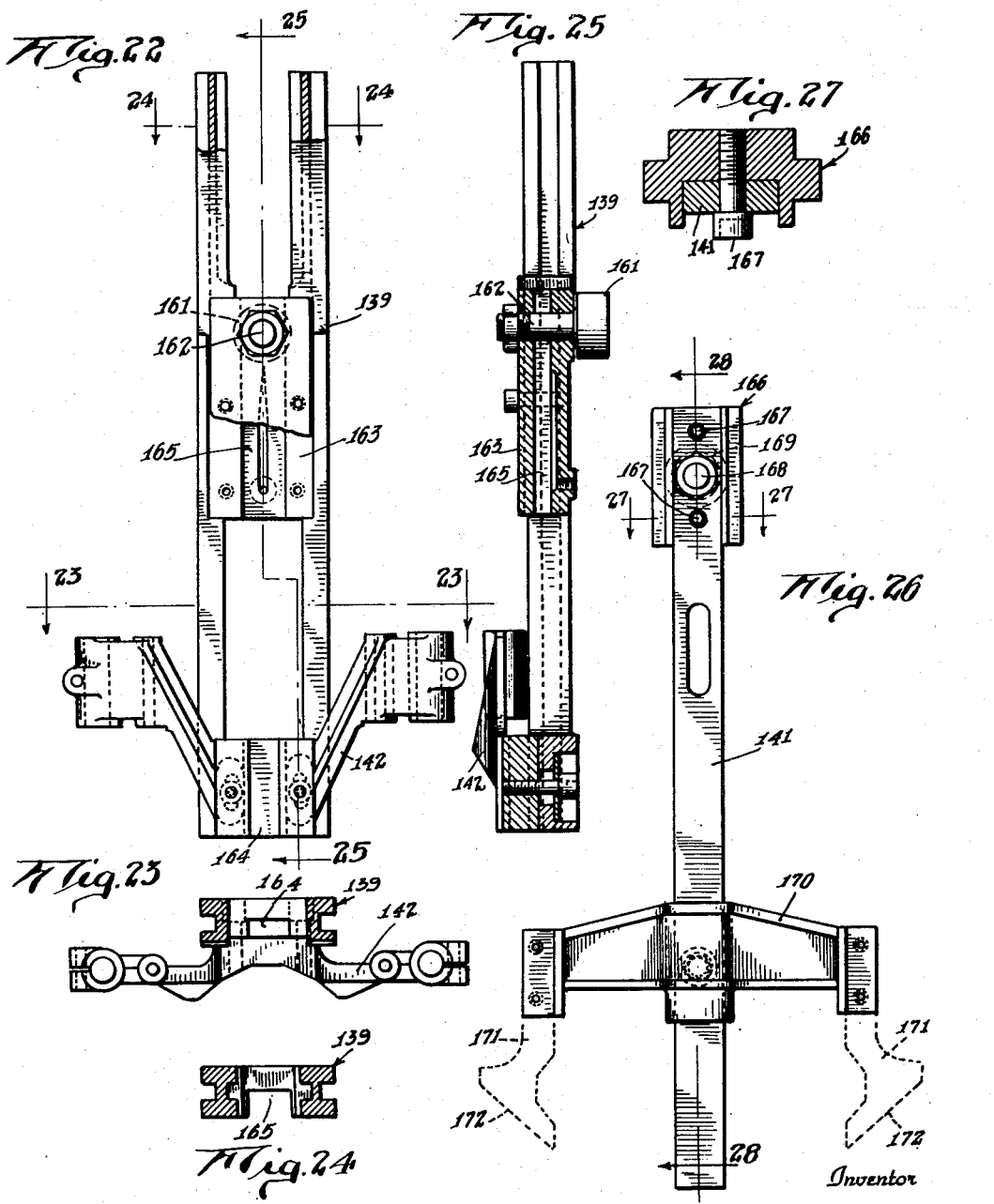

Oct. 28, 1947.  G. A. DUNN  2,429,749
MACHINE FOR PARING, CORING, AND HALVING PEARS
Original Filed Sept. 9, 1940  15 Sheets-Sheet 12
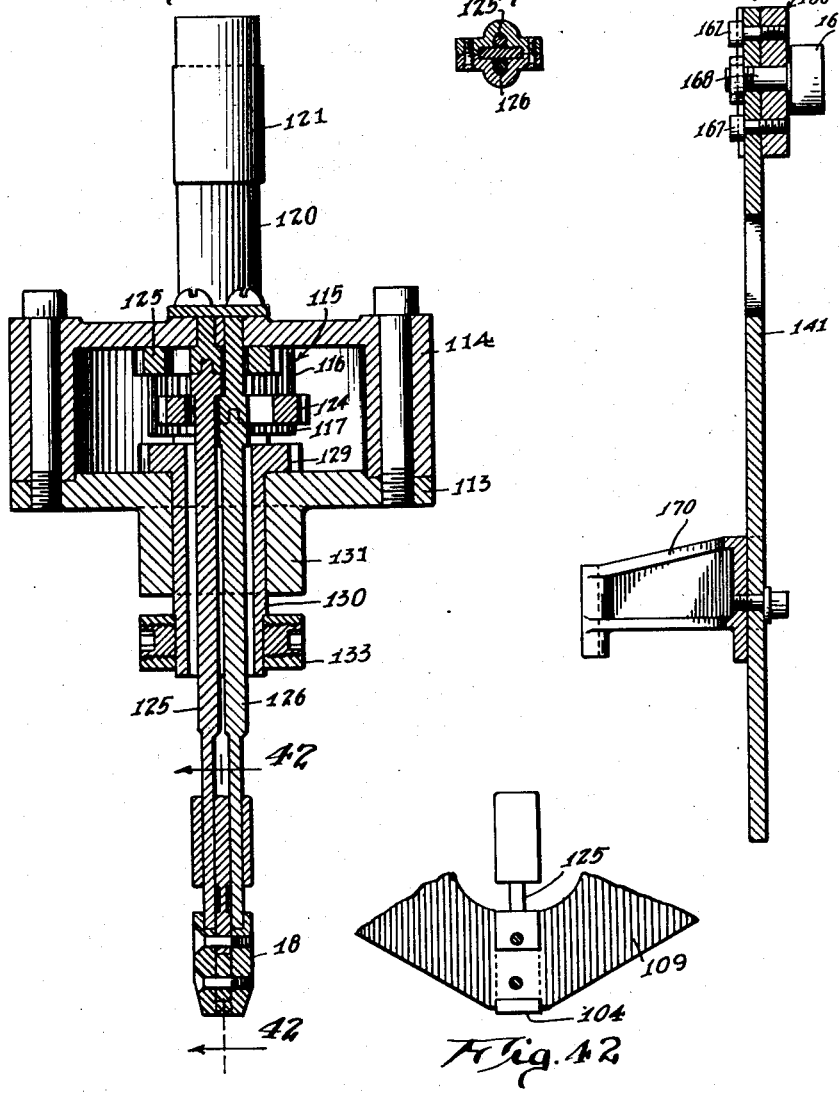

Oct. 28, 1947.  G. A. DUNN  2,429,749
MACHINE FOR PARING, CORING, AND HALVING PEARS
Original Filed Sept. 9, 1940  15 Sheets-Sheet 13
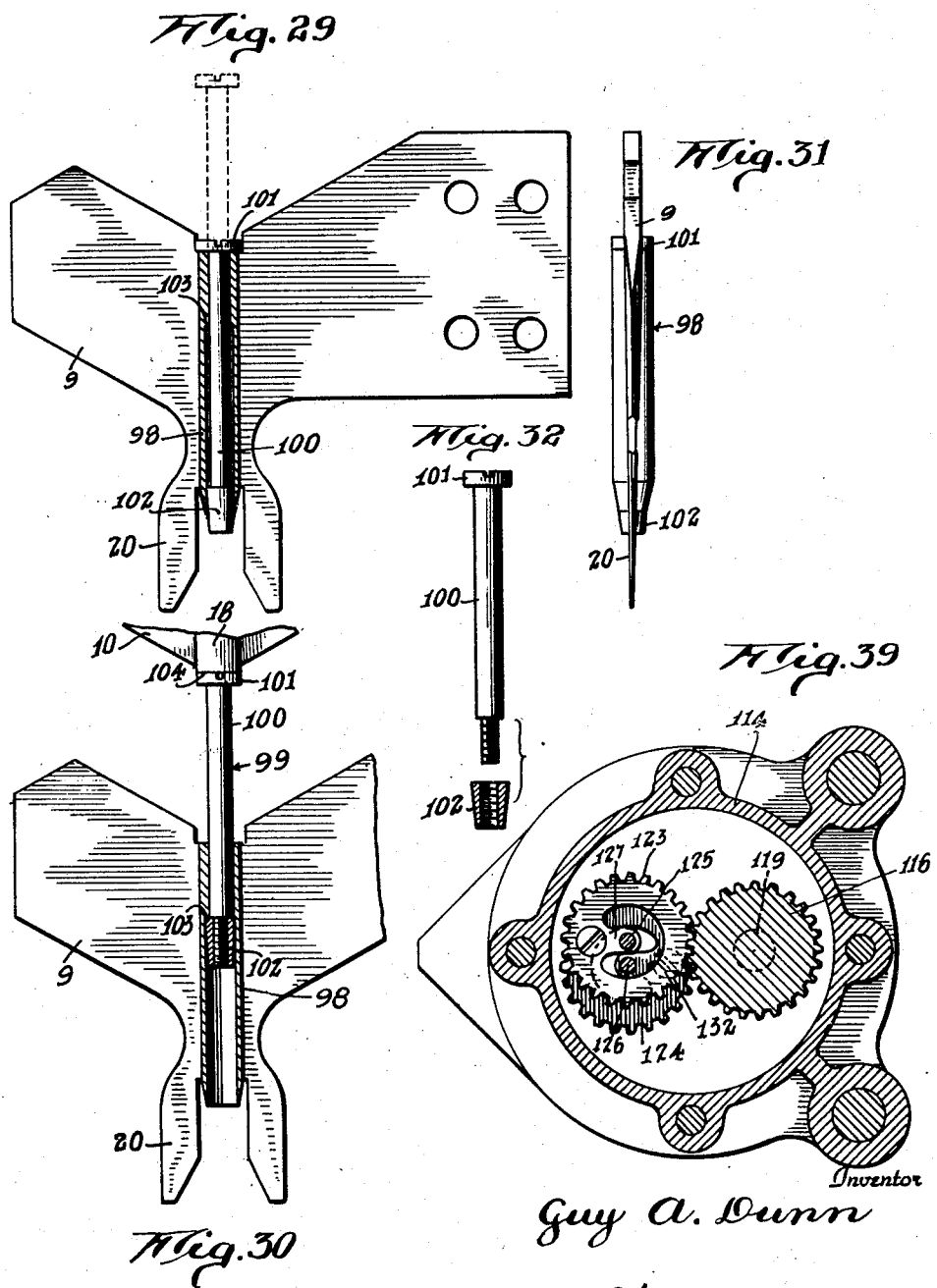

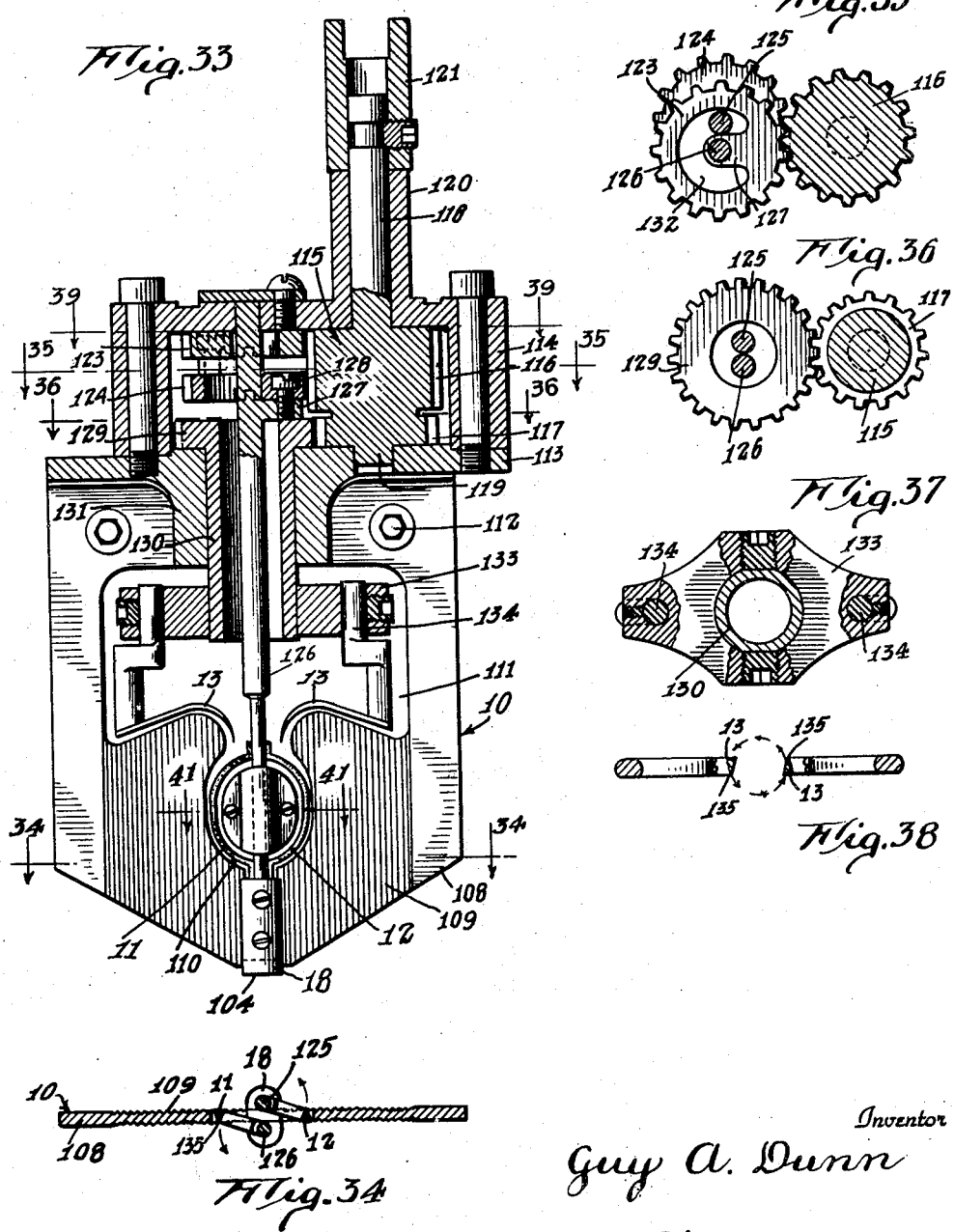

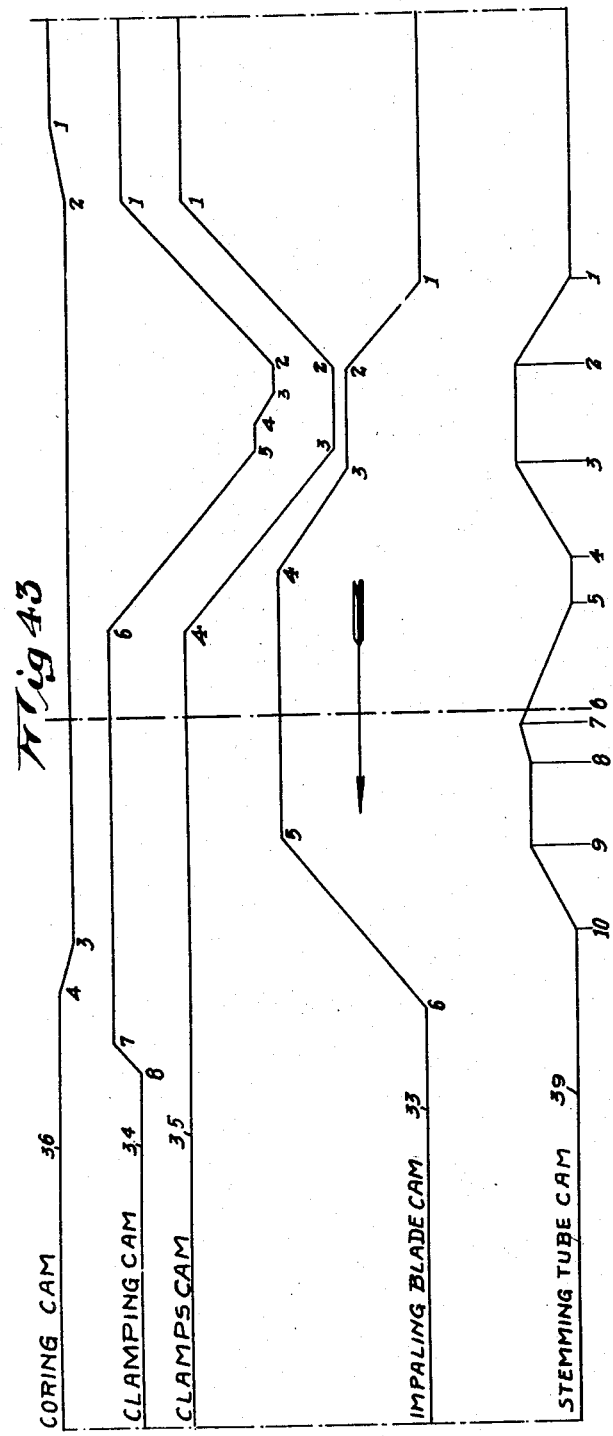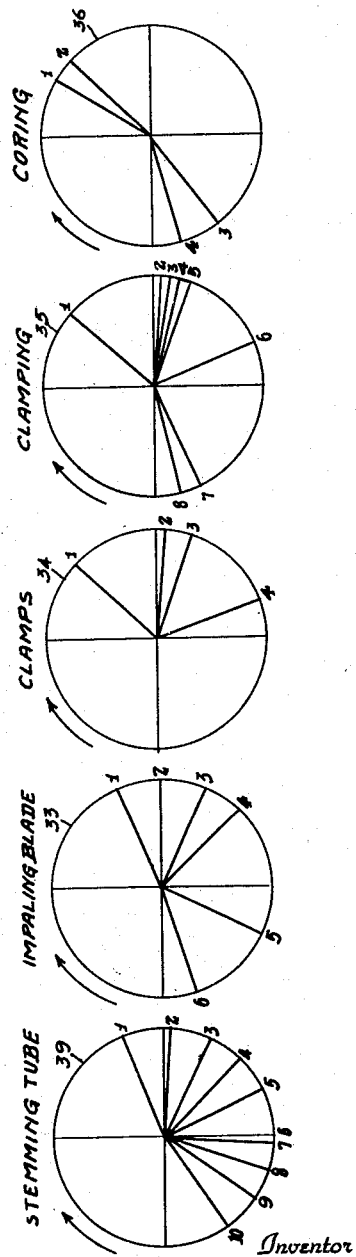

Patented Oct. 28, 1947

2,429,749

UNITED STATES PATENT OFFICE 2,429,749

MACHINE FOR PARING, CORING, AND HALVING PEARS

Guy A. Dunn, Oakland, Calif., assignor to California Packing Corporation, San Francisco, Calif., a corporation of New York Original application September 9, 1940, Serial No. 355,988. Divided and this application June 28, 1943, Serial No. 492,481

15 Claims. (Cl. 146—33)

1

This invention relates to a pear preparation machine and method and more particularly to a continuous pear preparation machine and method for use in the preparation of pears for canning, including the stemming, peeling, coring, trimming and halving of the pears.

This application is a division of my copending application, Serial No. 355,988, filed September 9, 1940, for Pear peeling machine.

It is an object of this invention to provide a method of peeling pears wherein the pears are mounted in effect upon a rod or tube which passes through the stem axis of the pear and in which method the operations of peeling, splitting, coring and trimming of the pear are performed while the pear is supported from its said axis.

Another object of this invention is to provide a pear peeling machine in which there is provided a peeling head having rotary peeling elements and where the pear to be peeled is supported with relation to the peeling elements on a stemming tube and guide member.

Another object of this invention is to provide a pear preparation machine in which the elements for preparing the pear are vertically aligned and operable for the successive stemming, peeling, splitting and coring of the pear.

Another object of this invention is to provide a pear preparation machine including a continuously operating rotary turret, means therein for gripping the pear from its opposed ends for holding the pear in the gripped position, means for peeling the pear while it is so gripped and for moving the pear from the peeling position in the continuously operating turret to a position of splitting, coring and trimming.

Another object of this invention is to provide a pear preparation machine including a coring unit having core or seed-pod-removing elements, a pear guide means operative to guide the pear from its stem axis, and a means for trimming or peeling the calyx end of the pear during the core or seed-pod-removing operations.

Another object of this invention is to provide a pear preparation machine including a splitting blade which has incorporated therein a guide means for guiding the pear from its stem axis, and means for moving the pear over the splitting blade as it is guided from its stem axis to cut the pear into halves.

2

Other objects and advantages of this invention it is believed will be apparent from the following detailed description of a preferred embodiment thereof as illustrated in the accompanying drawings.

In the drawings:

Figure 5 is a sectional elevational through the peeling head and stemming tube and guide embodied in my invention, the figure being broken away with the lower portion of the view included to the right of the upper portion thereof.

Figure 6 is a sectional elevation through the upper portion of the peeling head illustrating the upper cutting elements.

Figure 7 is a plan view partly in section taken substantially on the line 7—7 of Figure 6.

Figure 8 is a detached view partly in vertical section of the yoke member supporting a peeling cutter.

Figure 9 is a view taken at right-angles to that of Figure 8.

Figure 10 is a detached elevation of the stemming tube assembly embodied in my invention.

Figure 11 is an end sectional view of the peeler cutting drive means taken substantially on the line 11—11 of Figure 5.

Figure 12 is a sectional end elevation taken substantially on the line 12—12 of Figure 10.

Figure 13 is a side elevation of the lower peeling cutter.

Figure 14 is a side elevation of the upper peeling cutter.

Figure 15 is a top plan view of the guide member for the lower cutter of Figure 13.

Figure 16 is a top plan view of the guide member for the upper cutter of Figure 14.

Figure 18 is a top plan view of the guide clamps of Figure 17 illustrating the same in position with relation to the halving blade.

Figure 19 is a side elevation of the pear clamps.

Figure 20 is a sectional view taken substantially on the line 20—20 of Figure 19.

Figure 21 is a sectional view taken substantially on the line 21—21 of Figure 20.

Figure 22 is a view of the slide member support of the pear clamps.

Figure 23 is a sectional end elevation taken substantially on the line 23—23 of Figure 22.

Figure 24 is a sectional end elevation taken substantially on the line 24—24 of Figure 22.

Figure 25 is a sectional side elevation taken substantially on the line 25—25 of Figure 22.

Figure 26 is an elevation of the cam control slide for the pear clamps.

Figure 27 is a sectional view taken substantially on the line 27—27 of Figure 26.

Figure 28 is a sectional view taken substantially on the line 28—28 of Figure 26.

Figure 29 is an elevation of the splitting blade with the fibre plug-ejecting tube in ejecting position.

Figure 30 is a view similar to Figure 29 illustrating the stemming fibre-ejecting member in position of contact with a fragment of the coring plate.

Figure 31 is a side elevation of the splitting blade of Figure 29.

Figure 32 is a detached view of the stem fibre ejector plunger.

Figure 33 is an elevation of the coring and trimming unit.

Figure 34 is a sectional view taken substantially on the line 34—34 of Figure 33.

Figure 35 is a plan view of the coring blade driving gears taken substantially on the line 35—35 of Figure 33 illustrating the lower gear as misplaced for the purpose of vision.

Figure 36 is a plan view taken substantially on the line 36—36 of Figure 33, illustrating the calyx-trimming blade driving gears.

Figure 37 is a plan view of the calyx-trimming blade holder.

Figure 38 is a plan view of the seed-pod-removing knives.

Figure 39 is a plan sectional view taken substantially on the line 39—39 of Figure 33.

Figure 40 is a sectional edge elevation of the coring and calyx-trimming unit.

Figure 41 is a sectional end view taken substantially on the line 41—41 of Figure 33.

Figure 42 is a fragmental sectional view taken substantially on the line 42—42 of Figure 40.

Figure 43 is a cam layout drawing illustrating the cam surfaces and operating cycles of the respective cams employed in the continuous operating pear preparation machine and method embodying my invention.

Figure 1:
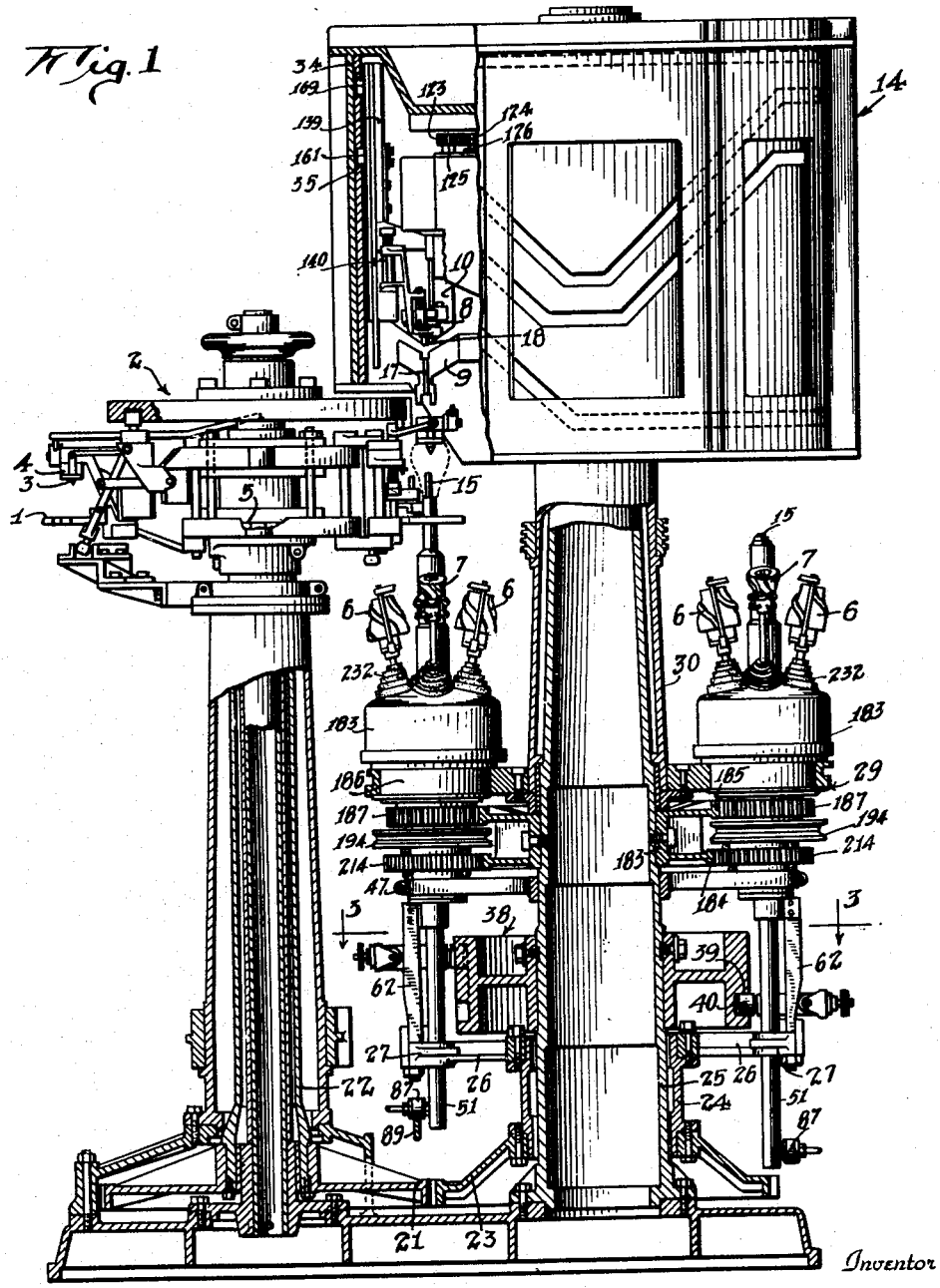
Figure 1 is an elevation partly in vertical section of the pear preparation machine embodying my invention.
Figure 2:
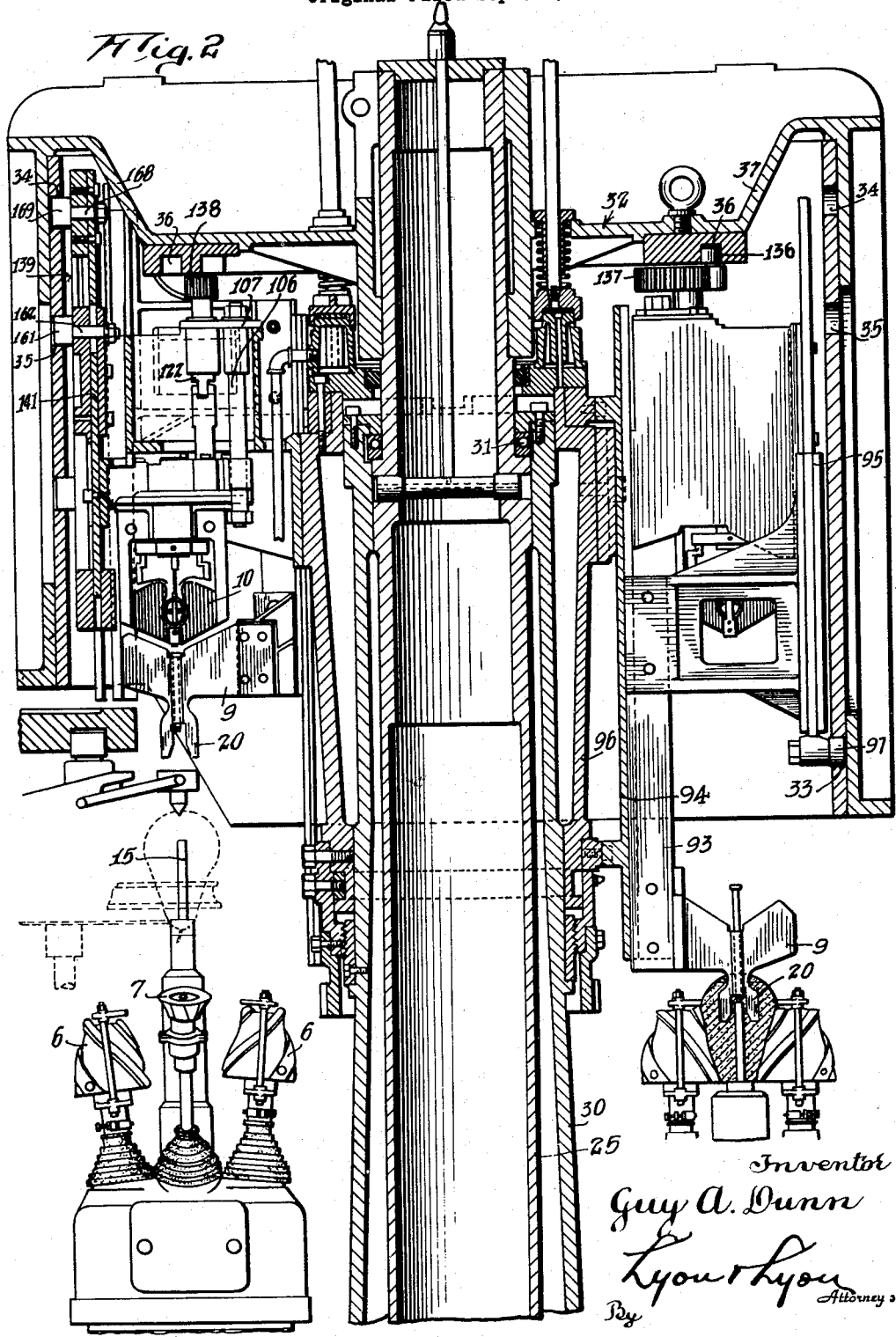
Figure 2 is an enlarged fragmental sectional elevation of the upper portion of the operating turret of the pear preparation machine embodying my invention.
Figure 3:
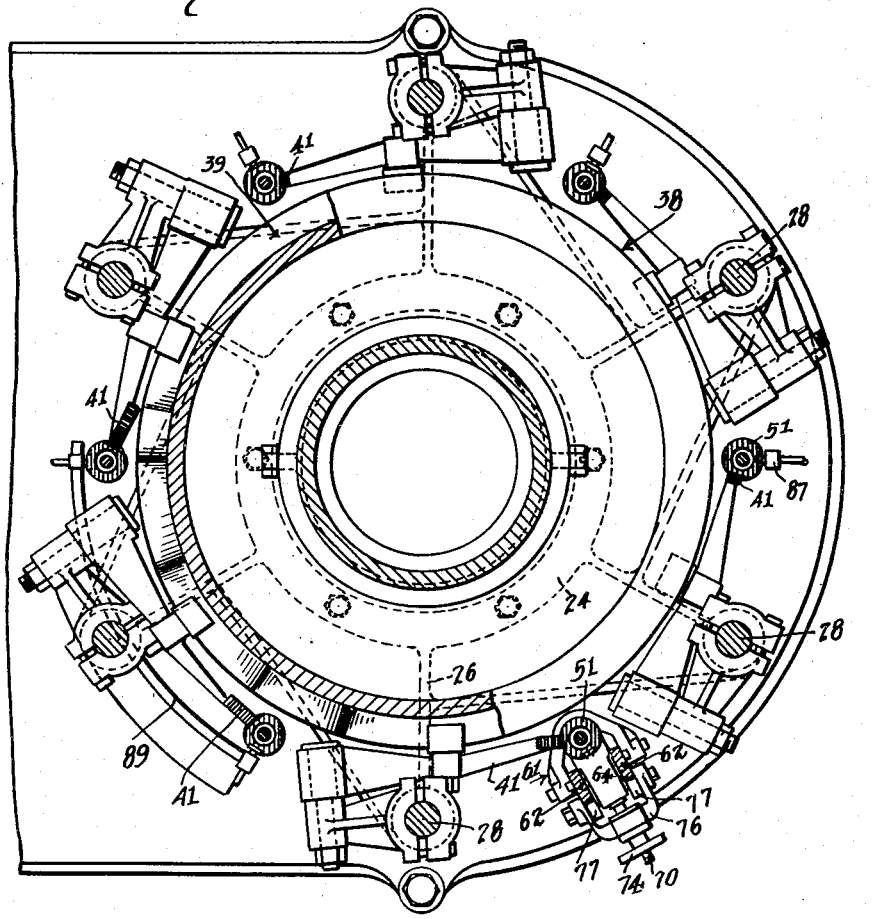
Figure 3 is a horizontal sectional view taken substantially on the line 3—3 of Figure 1.
Figure 4:
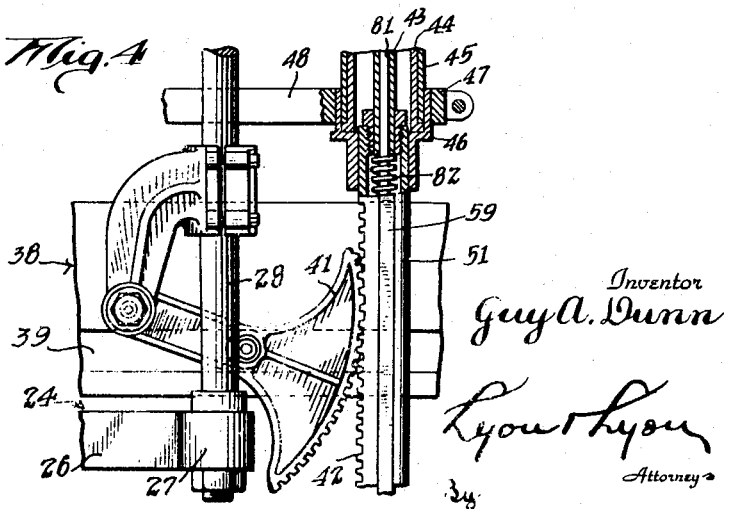
Figure 4 is a fragmental sectional elevation of the stemming tube actuating means embodied in my invention.
Figure 17:
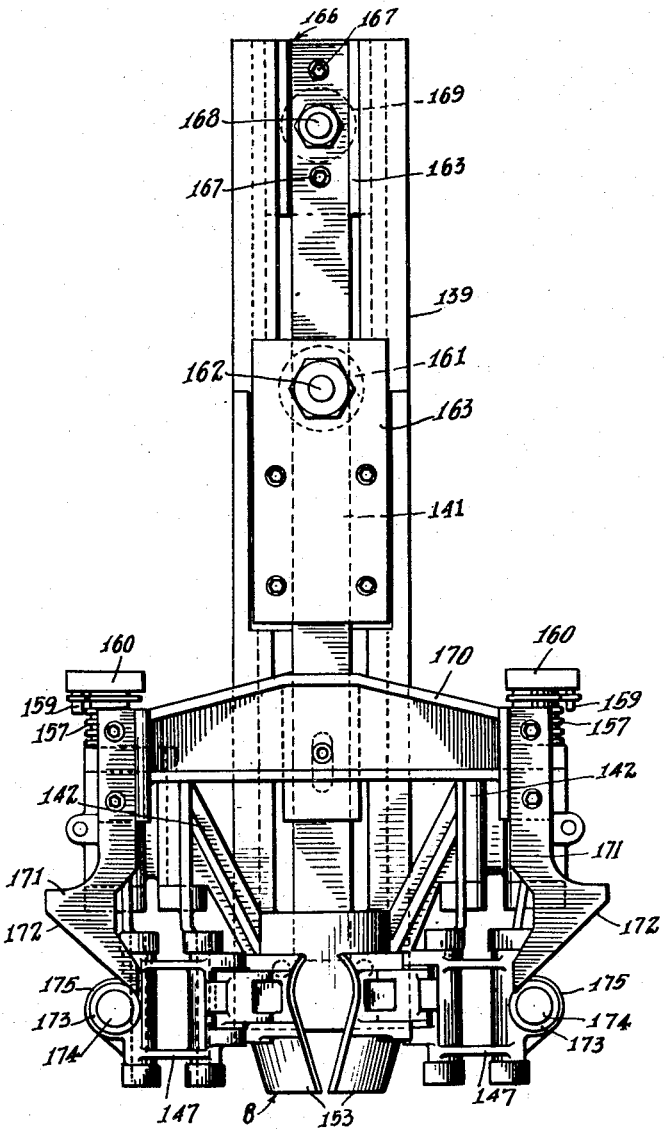
Figure 17 is a front elevation of the transfer pear clamps embodied in my invention.

In the preferred embodiment of my invention as illustrated in the accompanying drawings I have shown a continuous pear preparation machine and have indicated thereby apparatus which is suitable for carrying out the method embodying my invention.

In accordance with my invention, pears are fed into the feed ring 1 of the feed turret 2 with the neck of the pear projecting below the feed ring 1. The operator then centers the calyx of the pear with relation to a center point 3. Relative movement is effected between the feed ring 1 and center 3 so that the pear is held from the neck end and calyx, which establishes a reference axis through the pear.

As set forth in my co-pending application above referred to, the feed turret 2 is continuously rotating during this operation and the feed ring 1 and center 3 are in effect given a pause at the feed station permitting a greater period of time for the operator to feed the pear into the feed ring 1 and to center the calyx of the pear under the center point 3.

When the pear is thus positioned, a clamping plate 4 is actuated to engage the surface of the pear and hold the pear in the established position. As the pear moves around the turret, the neck of the pear is cut off below the feed ring 1 to sever the stem of the pear from the pear and also to establish a cut surface at right-angles to the established reference axis. A cutting disc 5 is provided in the path of movement of the pear for so cutting off the stem end.

The pear as thus positioned is carried around the feed turret 2 to a position where it is transferred to an operating turret. In the modification of my invention shown, this operating turret is a continuously operating or rotating turret in which the operations of stemming, or removing the stem fibre-containing core along the stem axis previously established, is performed and in which the pear is peeled by a peeling means which may be of the form including upper and lower rotary cutters 6 and 7 and wherein the pear after being peeled is gripped between a pair of clamps 8 transferred across a halving blade 9 which splits the previously stemmed and peeled pear into two halves.

After passing over the splitting blade 9, the pear is moved over a coring plate 10 (Fig. 33). On the coring plate 10 the seed-pod is removed through the medium of coring knives 11 and 12 and the calyx end and the calyx depression of the pear are trimmed and peeled by means of calyx-trimming knives 13.

The entire operation is carried out as a continuous operation and after the reference axis has been established through the pear and during the transfer of the pear from the feed turret 2 to the operating turret 14, the pear is impaled upon a stemming tube 15 which, as previously set forth, acts to remove the core along the stem axis of the fruit previously established in the feed turret, and which core contains the stem-containing fibres of the pear. The reference axis thus established in the feed turret becomes the axis along which the stemming tube 15 is thrust so that the pear is held on this axis during the peeling operation and the pear is thus held in definite position where the stemming tube 15 is thrust through the pear a distance which is determined by the resistance to upward movement of the pear established by the plate 4. This enables me to determine definitely the position of the seed-containing pod of the pear with relation to the position of the pear upon the stemming tube 15.

With the seed-pod thus determined, the clamps 8, in picking the pear off from the stemming tube 15, maintain the seed-pod in the definite position previously determined so that as the pear is fed in effect along a continuation of the tube 15 to a position over the seed-pod-removing knives 11 and 12, it is assured that the seed-pod of the pear will be in registry with the seed knives so that the coring operation may be effectively carried out to remove that portion of the fruit which contains the seed-pod.

During the transfer of the pear from the stemming tube 15 to its position with relation to the seed-pod-removing knives 11 and 12, and during the splitting of the pear by the splitting blade 9, the pear is passed over effective continuations of the stemming tube 15 so that throughout movement of the pear it is guided along the reference axis established between the ring 1 and the center point 3 in the feed turret 2. Thus on the splitting blade 9 there is provided a stemming tube continuation 17 and on the coring plate 10 there is provided a cylindrical element 18 which forms the further continuation of the rod or tube along which the pear is moved in being transferred over the respective elements of the machine.

The cutting off of the stem end of the pear by the cutting disc 5 to establish the surface at right-angles to the reference axis also establishes a flat surface at the stem end of the pear against which a stop collar 19 may be moved as hereinafter described to hold the pear from vertical downward movement during the peeling operation.

In order to hold the pear from rotation on the stemming tube 15 during the peeling operation, and also to maintain the pear in its position where the reference axis is established, I provide for the impaling of the pear from the calyx end with an impaling blade 20 which is carried by the splitting blade 9.

As set forth in my co-pending application above referred to, the impaling blade 20 is moved to impale the pear when the center 3 and holding plate 4 are moved out of contact with the pear and the pear has been moved into the control of the operating turret 14 upon the stemming tube 15.

The feed turret 2 and the operating turret 14 are geared together so that they operate in timed relation. Thus the drive gear 21 which drives the sleeve shaft 22 of the feed turret meshes with the driven gear 23 which is carried by the spider 24 which is journaled upon the stationary column 25 of the operating turret.

The spider 24 has a plurality of arms 26 having bosses 27 at their outer end into which drive rods 28 are secured. The drive rods 28 extend upwardly and are operatively connected to the peeling plate 29 and drive the peeling plate 29 around the stationary column 25.

Secured to the peeling plate 29 so as to be driven therewith is an outer column 30 which provides the drive column for driving the splitting blade 9 and the coring plate 10. The drive column 30 is supported on a thrust bearing 31 from the upper end of the stationary column 25.

Above the bearing 31 there is mounted upon the stationary column 25 a cam cylinder 32 which provides the cam track 33 for operating the splitting blade 9 and its impaling blade 20, the cam track 34 for controlling the vertical position of the clamps 8, cam track 35 for controlling the opening and closing of the clamps, and the cam track 36 formed in the cover plate 37 of the cam cylinder 32 for actuating the coring knives 11 and 12 and the calyx-trimming knives 13.

Means are provided for actuating the stemming tube 15, which means include a stationary cam ring 38 which is secured to the column 25 and has formed therein a camway 39 in which the stemming tube actuating cam roller 40 is positioned to actuate a gear segment 41 which meshes with a rack 42 for the raising and lowering of the stemming tube 15, as will hereinafter be specifically described.

As the pear is moved to the position to be transferred into the operating turret 14, the stemming tube 15 is thrust upwardly through the feed ring 1 to impale the pear along the previously determined stem axis of the pear. The stemming tube and its operating means may be of any suitable or desirable construction and are herein illustrated as of the following construction:

The stemming tube 15 is secured to the upper end of a guide tube 43, which guide tube 43 is mounted to reciprocate within a sleeve 44. The sleeve 44 is in turn mounted within a cylindrical column 45, and this concentrically disposed sleeve and column arrangement is secured within a collar 46 which is clamped by means of a split clamp 47 upon the end of arms 48 of a lower spider plate 49 journaled on the stationary column 25 to rotate with the peeling plate 29.

In the foregoing description I have dealt only with one stemming tube assembly, and while the continuous operating pear preparation machine illustrated in the drawings has six peeling assemblies, and would also have a corresponding number of feed rings 1 of the feed turret 2, and a corresponding number of splitting blades 9 and coring plates 10, in the description of the invention as herein set forth I will confine myself to the description of the construction of one only of these integrated elements of the complete machine.

The guide tube 43 is secured at its lower end by means of a connecting collar 50 to an operating tube 51. The operating tube 51 extends downwardly and it is closed at its lower end by means of a plug 52.

Mounted within the lower end formed along the outer surface of the actuating tube 51 is the rack 42 by the medium of which the said stemming tube assembly is moved vertically to impale the stemming tube 15 into the pear along the reference axis thereof.

The cam surface formed by the camway 39 is such as to complete the vertical movement of the stemming tube 15 during the interval of transfer of the pear from the transfer turret 2 to the operating turret 14. As set forth in my aforesaid co-pending application, the camway 39 is formed so that the stemming tube assembly is thereafter dropped after the ring 1 has opened to permit the pear to pass out of the ring 1 and to pass under the center 3 during the interval of transfer of the pear from the feed turret to the operating turret.

In order to hold the pear on the stemming tube 15 at the position thus established by the impaling of the stemming tube 15 along the reference axis, I provide in connection with the stemming tube 15 a limit collar 53 which is then moved to position to engage the previously cut-off end of the pear and to support the pear in the position which has been determined by the center 2 and lock-plate 4 so that the relationship of the seed-pod of the pear as it is supported upon the stemming tube 15 is established with reference to the locked position of the pear in the feed turret.

The collar 53 is secured to the end of a tube 54 and the tube 54 is in turn slidably mounted within the top-piece 55 of a guide cylinder 56. The guide cylinder 56 carries at its lower end a collar 57 through which the guide sleeve 43 slides.

Secured to the lower end of the tube 54 is a collar 58. Secured to the collar 58 is a brake ribbon 59, which ribbon extends downwardly within the sleeve 44 through a recess formed in the collars 57 and a longitudinal groove 60 formed in the outer periphery of the operating tube 51.

Secured to the collar 46 at its upper end are spaced cam plates 62. The cam plates 62 are secured at their lower end to a brake plunger yoke 61 which extends around the operating tube 51. Secured to the operating tube 51 by means of screws 63 is a brake cylinder 64 which provides shoulders 65 along which the inner edges of the cam plates 62 slide. The brake cylinder 64 at its outer end is provided with a collar 66 through which a tube 67 slides. The tube 67 is urged to move inwardly with relation to the collar 66 by means of a spring 68 which is mounted within the brake cylinder 64 positioned to engage the end of the collar 66 and engage a flange 69 formed at the end of the tube 67.

Mounted within the tube 67 is a brake plunger 70 which carries at its inner end a brake shoe 71 which is adapted to engage the surface of the brake ribbon 59. The plunger 70 is urged toward brake-applying position by means of a spring 72. The spring 72 is mounted within the tube 67 to engage a shoulder 73 formed on the plunger 70 and to engage an adjustment screw 74 at its opposite end. The adjustment screw 74 is threaded within the tube 67 so that by threading the same in or out, the pressure exerted by the spring 72 may be regulated. The collar 66 being threaded to the cylinder 64 also provides for adjustment of the pressure exerted by the spring 68 tending to force the tube 67 inwardly to where its end engages a shoulder 75 formed on the plunger 70.

A yoke 76 is secured to the tube 67. The yoke 76 carries at its inner end a pair of cam rollers 77 which are carried upon shafts 78. The shafts 78 extend inwardly to provide stops 79 which engage the end of the cylinder 64 to limit the inward movement of the tube 67, thereby limiting the application of pressure due to the spring 68 which tends to force the brake shoe 71 against the brake ribbon 59.

As the operating tube 51 is moved downward under the influence of the segment 41, the cam plates 62 slide under the cam rollers 77 so that when the plates 62 as they are viewed in Figure 5 move downwardly so that the inclined surfaces 80 of the cam plates pass under the cam roller 77, the yoke 76 is moved outwardly to relieve the pressure of the brake shoe 71 against the brake ribbon 59 permitting the stop collar to move downwardly when contacted by the cut end of the pear. The friction between the plates is sufficient to prevent the free falling of the collar; thus the stop collar is located with reference to the end of the pear prior to the upward movement of the stemming tube 15 to impale the pear.

Means are provided within the stemming tube assembly for ejecting from the stemming tube 15 the core of the pear which is cut from the pear by impaling the stemming tube along the stem axis. This core contains the stem fibre of the pear.

This means as herein illustrated includes a plug-ejector tube 81 which is slidably mounted within the sleeve 43 and is yieldably returned from ejecting position to eject by means of a spring 82. This spring 82 surrounds the ejector 81 below the connecting collar 50 and above the plug 83 which is secured to the lower end of the plunger cylinder 84. The plunger cylinder 84 is fitted within the operating tube 51 and surrounds the lower end of the ejector tube 81. The ejector tube 81 is closed at its upper end by means of a centrally bored cap 85.

Secured within the plug 83 is a shaft 86 upon which there is journaled a cam roller 87. Formed in the operating tube 51 is a slot 88 through which the shaft 86 may move as the cam roller 87 engages a cam 89 (Figure 1) to actuate the ejector tube 81. Connected with the shaft 86 is a hydraulic coupling 90 to which the water connecting conduit 91 is attached. Formed through the shaft 86 and through the plug 83 is a passage 92 through which water from the conduit 91 may pass into the interior of the ejector tube 81 to flush the stemming tube 15 with water.

After the stemming tube has been impaled through the pear and the stop collar 53 has been locked in its position of engagement with the cut end of the pear, the splitting blade 9 with its impaling blade 20 is impaled into the pear from the calyx end. This impaling of the blade 20 into the pear from the calyx end occurs after the pear has been transferred into the operating turret 2 and the pear has passed out from under the center 3 and locking plate 4, as fully set forth in my copending application above referred to.

Any suitable or desirable means may be employed for actuating the impaling blade 20, but as herein illustrated, this means includes the mounting of the splitting blade 9 on a slide member 93. The slide member 93 is mounted to slide upon slide brackets 94 and 95 positioned within the cam cylinder 32. The slide brackets are supported from a spider 96 which is secured to the driving column 30. Thus the brackets rotate with the column 30.

The slide 93 carries a cam roller 97 which rides in the camway 33. The camway is formed as diagrammatically illustrated in Figure 43 to move the impaling blade 20 down to impale the pear from the calyx end and to remain in this position for a period of time sufficient to permit the peeling operation to be performed by the lower peeling cutters 6 and the upper peeling cutters 7.

After the peeling operation is completed, the slide 93 is raised to move the pear out of the peeling zone after the pear has been gripped by the clamps 8 and passed over the splitting blade 9 by movement of the clamps 8. The splitting blade remains in this elevated position until it is returned to the transfer position to be impaled in another pear. The impaling blade 20 is of forked construction providing spaced blades which pass into the flesh of the pear upon opposite sides of the seed-pod, thereby avoiding the necessity of thrusting the blade into the stem fibres of the pear surrounding the seed-pod. The forked construction also provides for a greater width of blade which more effectively prevents rotation of the pear during the peeling operation.

The splitting blade 9 and impaling blade 20 as viewed in Figures 29 to 32, inclusive, are formed with an upper stemming tube section 98 which aligns with the stemming tube 15 and operates to cut a stem fibre plug or cylinder from the pear above the stemming tube 15. This plug would normally be retained in the stemming tube 98 so that a plug ejector 99 is provided. This ejector is formed as a rod 100 having a head 101 at its upper end and a threaded ejector cap 102 at its lower end.

The assembly of the ejector 99 is mounted axially of the tube 98 and the ejector cap 102 is arrested in its movement through the tube 98 by means of a shoulder 103 formed in the tube 98. The tube 98 also forms the extension of the rod over which the pear is moved during the splitting of the pear forming a guide guiding the pear through the stem cavity formed by the combined actions of the stemming tubes 15 and 98. Therefore the pear is guided during the halving operation along its predetermined stem axis.

After the pear passes over the splitting blade 9 and is cut into halves and as it is carried by the clamps 8, it is moved vertically upward to pass over the coring plate 10 to align the seed cavity with the coring knives 11 and 12. During this vertical movement of the pear the halving blade 9 moves upwardly so that the head 101 of the ejector 99 engages the end surface 104 of the coring plate guide 18 with the result that the ejector 99 is arrested in its movement as the splitting blade 9 continues its upward motion, thereby forcing the pear plug or cylinder out of the stemming tube 98 clearing the stemming tube for a subsequent operation.

With the pear thus located, the coring knives 11 and 12 are actuated to cut the seed-containing pod from the pear and at the same time the calyx trimming knives 13 are actuated to trim the calyx of the pear to complete any peeling which may be required at the upper end of the pear. Any suitable or desirable means may be utilized for effecting this operation and as herein illustrated, the coring plate 10 is supported within the cam cylinder 32 in position of vertical alignment with the splitting blade 9 and stemming tube 15 by means of supporting rods 106, which rods are in turn secured to a top plate 107 of the bracket 94.

The coring plate assembly as herein illustrated is of the following construction and includes a plate section 108 which has a roughened surface 109 with which the cut surfaces of the pear are contacted to hold the pear from movement relative to the plate section 108. The plate section 108 has a coring knife recess 110 formed therein within which the coring knives 11 and 12 are positioned. This recess 110 is continued to form an enlarged calyx knife recess 111 within which the calyx knives 13 are positioned and operated. The plate section 108 is secured by means of bolts 112 to a gear case base 113. Removably secured to the base 113 is a gear case cover 114. Journaled within the gear case thus formed is an actuating pinion 115 which has two gear teeth sections 116 and 117.

The pinion 115 is formed as an extension of the operating shaft 118 and is formed with a stud extension 119 journaled in a recess formed in the base 113.

The shaft section 118 is journaled within a cylindrical extension 120 of the cover 114 and is secured to a coupling 121 by means of which the shaft section 118 is coupled with the driving shaft 122.

The upper gear teeth 116 mesh with companion pinions 123 and 124. These pinions are secured to shafts 125 and 126, respectively. These shafts are mounted in parallel relation and are journaled at their upper ends in the cover 114. Each of the shafts 125 and 126 is provided with a lateral extending securing arm 127 to which its respective pinion is secured by means of a cap screw 128. The arms 127 provide spacers between the gears and between the pinion 124 and the driven pinion 129. The driven pinion 129 meshes with the lower gear section 117 of the gear 115 and is formed as an extension of the sleeve 130 which is journaled within the guide boss 131 of the base 113.

The two shafts 125 and 126 pass through the sleeve 130 and support the coring knives 13 and 14 within the recess 110.

The shafts 125 and 126 are of reduced diameter and extend beyond the recess 110 and are journaled within the cylindrical guide 18 which is mounted on the coring plate section 108. The pinions 123 and 124 are provided with arcuate cutaways 132 (Figure 35) within which the shafts of the other of said pinions operate. Secured to the lower end of the sleeve 130 is a carrier 133 to which shanks 134 of the calyx-trimming knives are secured.

The coring knives 11 and 12 are oppositely sharpened so that their cutting edges 135 are oppositely directed as indicated in Figure 38. The knives are oscillated and pass respectively around the seed-pods of each half of the fruit and are returned to their position within the plane of the coring plate section 108.

Means are provided for oscillating the coring knives 11 and 12 and the calyx trimming knives 13, which means may be of any suitable construction and are herein illustrated as including a cam roller 136 carried on a shaft to ride within the camway 36 formed in the cover 37 of the cam cylinder 32. Secured to an arm carried by the said shaft is a gear segment 137. The gear segment 137 meshes with a pinion 138 carried by the shaft 122. Thus as the coring plate assembly passes around the operating turret, the oscillation of the gear segment 137 results in rotation of the shaft 122 to oscillate the coring knives 11 and 12 and calyx trimming knives 13.

Any suitable or desirable means may be employed for actuating the clamps 8 to cause the same to grip the pear and transfer the pear from the peeling means over the splitting blade 9 and to position upon the coring plate 10. As herein illustrated, these means are a slide frame 139 mounted within the cam cylinder 32 to slide on guides 140. Mounted to slide within the slide 139 is a slide 141. Carried at the lower end of the guide frame 140 is a yoke 142. The yoke 142 pivotally supports on pivot pins 143 the arms 144. Also supported by the yoke 142 on pivot pins 145 are parallel arms 146.

Secured between the arms 144 and 146 are clamp-supporting arms 147. Pivotally mounted between these parallel arms are clamp arcuate frames 148. These frames are pivotally mounted upon pivot pins 149 carried by the arms 147.

In order to yieldably resist rotation of the arcuate frames 148 is a flat spring 150 carried by the spring brackets 151 formed integral with the arms 147 and adapted to be engaged by the flat surface 152 of the supporting boss of the arcuate frames 148. Pivotally carried by the arcuate frames 148 are clamp members 153, one pair of such clamp members being carried by each arcuate frame, and these clamp members are pivotally carried by the arcuate frames by means of pins 154 which are adapted to be positioned in either pair of receiving holes 155 and 156, dependent upon the diameter of the fruit being processed.

Means are provided for yieldably urging parallel arms 144 and 146 toward each other to yieldably urge the clamp members 153 toward clamping position. This means as herein illustrated includes the springs 157 which are wound upon the supporting pins 143 and are tied at their respective ends to pins 158 and 159, respectively.

the pin 158 being secured to the arm 144, while the pin 159 is secured to a collar 160 of the pivot pin 143.

Means are provided for moving the frame 139 which carries the clamps 153 vertically in timed relation with the operation of the turret 14 so as to transfer the pears from the peeling means over the splitting blade 9 and coring plate 10 and to return the clamps 8 in position to pick up another pear after the seed-pod trimming operations have been completed.

As herein illustrated, this means includes a cam roller 161 which is carried by the pin 162 mounted between the spacing guide plates 163 of the slide frame 139. The roller 161 is adapted to ride in the camway 35 formed in the cam cylinder 32. This camway is formed as illustrated in Figure 43 to coordinate with the other camways to effect the hereinafter described operation.

Means are provided for actuating the clamps 153 to the open position, which means as herein illustrated includes the slide 141 which is slidably mounted within the slide frame 139 in guideways 164 formed in the yoke 142 and upon the guide surfaces 165 formed on the connecting plates 163. The slide 141 carries at its upper end a guide block 166 within the frame 139 and is secured to the slide 141 by means of cap screws 167.

Carried on a pin 168 in the block 166 is a cam roller 169. This cam roller 169 is adapted to ride in the camway 34 formed in the cam cylinder 32. The camway 34 is formed as illustrated in Figure 43 to coordinate the operation of the slide 141 with relation to the operation of the slide 139 and to time the operation of the slide 141 with relation to the other operations performed in the turret 14.

Carried by the slide 141 is a yoke 170 to the outer ends of which are secured cam blocks 171, the cam surfaces 172 of which are adapted to engage cam rollers 173 carried by pins 174 which are passed through and secured to the outer extensions 175 of the clamp-carrying arms 147. Thus in timed relation with the reciprocation of the slide frame 139, the slide 141 is raised and lowered to move the cam surface 172 over the cam rollers 173 to thereby cause the clamp members 153 of the clamps 8 to open and close on the pear as required for the transferring of the pear through the different positions and operations performed in the operating turret.

As illustrated in Figure 21, the individual clamp members 153, of which there are four, are shaped to the approximate contour of the pear so that their inner surface 176 will at least approximate the contour of the pear after it has been peeled. The contour of this surface is dedetermined from analyses of the average contours of many pears.

Means are provided for removing the peeling from the pear, which means may be of any suitable or desirable construction and is herein illustrated as being of the form employing rotary cutters combining a rotary and shearing action for the cutting of the peeling from the pear surface and as hereinabove set forth, includes lower peeling members 6 and upper peeling members 7 which carry cutting blades 177 and 178, respectively, which are contoured to the average contour of a pear to be peeled.

The cutters 177 and 178 are mounted upon ridges formed on the outer surface of the body members 179 and 180 of the said cutters so as to leave a space to the rear of the cutters for the peel to pass between the cutting blade and the cutter bodies. As is illustrated, the cutting knives 177 and 178 are spiraled on the bodies of the cutters so that as the blades are rotated in contact with the surface of the pear which is held stationary, the cutters produce a shearing action over the surface of the pear as the cutters revolve around the pear and as the cutters themselves are rotated during their travel around the periphery of the pear. The upper and lower cutters 6 and 7 are operated simultaneously.

In order to control the depth of the cut which the cutters make, the lower cutters carry contact bars 181 while the upper cutters carry contact bars 182 which are adapted to contact the surface of the pear being peeled to regulate the depth at which the cut is made to remove the peeling.

Any suitable or desirable means may be provided for the purpose of actuating the cutters 6 and 7 to maintain the same in contact with the fruit being peeled and to revolve the cutters while so held around their axes and to rotate the cutters around the axis of the pear as it is supported by the stemming tube 15 and held from rotation by means of the impaling blade 20.

As herein illustrated, the means for effectively driving the cutters includes a pinion bracket or cylinder 183 secured to the stationary column 25 (Figure 1). This pinion cylinder supports two pinions 184 and 185 which are held from rotation. It will also be recalled that the peeling plate 29 is rotated around the stationary column 25 by its driving connection with the spider 24.

Mounted within circular recesses formed in the peeling plate 29 is a sleeve member 186 which carries a gear to the section 187 adapted to mesh with the pinion 185. Secured to the sleeve 186 is a ring 188 to which the housing 189 is secured. Thus the entire peeling assembly which is supported within the housing 189 is rotated around the axis of the stemming tube 15 or around the predetermined axis formed through the pear.

The sleeve 186 is journaled upon bearings 190 which are supported upon a quill shaft 191 by means of a spacing collar 192 held in position by means of bolts 193. The quill shaft 191 is rotatably mounted upon the guide sleeve 45. Secured to the quill shaft 191 is a pulley 194 over which a drive belt 195 is trained to drive the quill shaft 191.

The quill shaft 191 has formed at its upper end gear teeth 196 which mesh with pinions 197 carried by the operating shafts 198. The operating shafts 198 are secured through universal joints 199 to the drive shafts 200 upon which the lower cutters 6 are mounted. There are two such lower cutters 6 and two upper cutters 7 for each peeling unit. The upper cutters 7 (Figure 6) are driven in substantially the same manner and their shafts 201 are secured by means of the universal joints 199 to the driven shafts 198.

The cutters are secured to their respective shafts by means of supporting blocks 202 and 203. These blocks are provided with annular shoulders 204 upon which the internal flanges 205 of the lower cutters 6 and the ends 206 of the upper cutters 7 are rested.

Securing washers 207 and nuts 208 are mounted upon and threaded to the reduced portions 209 of the shafts 200 and 201, respectively, for securing the cutters 6 and 7 in position.

The shafts 198 are supported within the supporting annulus 210 which is secured to the ring 188. The universal joint 199 is provided with two right-angle pivot pins 211 and 212 and the annulus 210 is formed with a flared sleeve section 213 which provides a housing for the universal joint 199.

Means are provided for controlling the pressure exerted by the cutting knives 177 and 178 during the peeling operation and for moving the cutters on the universal joints 199 to and from their cutting position, which means as herein illustrated are of the following construction:

A pinion 214 is secured to the sleeve 45 and meshes with the stationary gear 184 secured to the stationary column 25. As the turret 14 revolves around the stationary column, the gear 214 and sleeve 45 are rotated.

Mounted upon the sleeve 45 are lower and upper control cams 215 and 216 for controlling the operation of the lower cutters 6 and upper cutters 7. The control cams 215 are positioned to engage cam rollers 217 which are secured to the quill shaft 218 which surrounds the shaft 200. The quill shaft 218 is secured at its upper end to a bearing housing 219 in which there is positioned a bearing 220. The bearing 220 has its inner race seated upon a shoulder 221 formed on the shaft 200. The block 202 provides the cover for the bearing housing 219. The same construction is employed for positioning the cam roller 222 for controlling the swinging of the upper cutters 7 upon their universal joints 199.

As illustrated in Figure 7, means are provided for yieldably urging the cutters toward cutting position against the pressure exerted by the cams 215 and 222, which means are as herein illustrated, composed of a yoke 223 which is secured by means of its central collar 224 to the quill shaft 218. The yoke 223 at its opposite ends is provided with spring seats 225 in which the ends of springs 226 are seated. The opposite ends of the springs 226 are seated against adjustment studs 227 which are threaded within cylinders 228 secured within bosses 229 formed in the cutter housing 189.

The threading of the screws 227 within the cylinders 228 adjusts the tension which is exerted by the springs 226 tending to force the cutters 6 and 7 against the pear.

The yoke 223 is pivotally connected on pins 230 which are mounted upon the universal joint housing 213. The cutter housing 189 is provided with openings 231 through which the cutter shafts extend and these openings are closed by flexible closure members 232 which may be formed by any suitable make of fabric, rubber, or like material. The flexible closure members 232 are secured at their upper ends to rings 233 which are journaled upon the sleeves 218. The closure members 232 are secured at their lower ends to rings 234 which are fitted within the apertures 231, thereby providing a flexible closure which permits freedom of movement of the cutter shafts in movement to or from cutting position.

As viewed in Figures 13 to 16, inclusive, the depth control bars 181 and 182 are mounted with respect to their cutters in the following manner: The housings 219 are provided with arms 235 and 236. The arms 235 support pins 237 upon which the bars 181 or 182 are pivotally mounted. At their other ends the members 181 and 182 are adjustably supported on pins 238 which are adjustably mounted in slots 239 formed in the ends of the arms 236, thereby permitting adjustment of the curved depth control members 181 and 182.

From the foregoing it will be apparent that I have developed a continuously rotating pear preparation machine and method in which the pears are first positioned and held in position upon a reference axis established during the feeding operation and where the entire operations of peeling, coring, splitting, stemming, and halving of the pears are performed with definite relationship to the said predetermined axis. It will be apparent that in so determining the reference axis I also determine the position of the seed-pod of the pear with reference to a cut end surface of the pear and maintain this established relationship through the operations upon the pear which is at all times moved in effect the same as if it were slid along a rod passed through the reference stem axis and moved to its respective positions with direct relationship to the cut end surface of the pear (in this modification the cut stem end of the pear) so that the pear is located in correct position for peeling with relation to the peeling members and for removing the seed-pod so that the seed-pod may be accurately aligned with the coring knives 11 and 12 at the same time that the calyx end of the pear is located with reference to the calyx trimming and calyx end peeling knives 13.

The modification of my invention as herein set forth is obviously susceptible of wide variations in structural details and in specific means for accomplishing the respective operations of the peeling, splitting, halving, stemming, removal of the seed-pod and trimming of the calyx, all within the principles of my invention as hereinabove specifically set forth, all of which modifications will come within the scope of the hereinafter appended claims.

I claim:

1. In combination with a device for preparing pears, means for removing stem fibers comprising a sharpened stemming tube arranged to be inserted at the stem end of the pear and to be forced into the seed pod, means for preventing displacement of said pear in a direction opposite to the direction of insertion of said stemming tube comprising a collar slidably disposed about said stemming tube and a friction release assembly normally maintaining said collar fixed relative to said stem, means for releasing said friction assembly when desired, means for elevating said stemming tube and collar as a unit for the transference of a peeled pear for coring, and means operable within said stemming tube for ejecting stem fibers.

2. In combination with a pear preparing machine having a rotating turret in which are disposed a plurality of sections each having a series of vertically aligned preparing stations, means for supporting a pear at a stemming station and for displacing it upwardly to a splitting station, comprising a sharpened stemming tube arranged to be forced into the stem end of a pear and around the stem fibers thereof, a collar slidably surrounding said stemming tube, a friction catch arranged to release said collar from said stemming tube to permit the insertion of said stemming tube into a pear while allowing said supporting collar to be stopped by contact with said pear, means for fixing the position of said supporting collar relative to said stemming tube after said contact, means for traversing said stemming tube assembly upwardly while carrying said pear, means for supporting the end of said pear opposite said stemming tube, and means for ejecting stem fibers remaining in said tube after the transfer of said pear to another stage.

3. In combination with a machine for the preparation of pears, means for supporting said pear at a peeling station and simultaneously cutting out a plug of stem fibers therefrom comprising a tubular stemming knife arranged to be inserted into the stem end of a pear and about the stem fibers therein, means for locking a supporting collar against the stem end of a pear, means for releasing said collar from said stem at a desired point, and means for traversing said pear upwardly from the peeling station toward the splitting station comprising a cylindrical guide member slidably supporting said stemming tube assembly having a pear-engaging end section, a toothed rack cut into the lower portion of said assembly and arranged to cooperate with a toothed sector, and a cam means arranged to actuate said sector to move the cylindrical guide member longitudinally of the stemming tube and advance the pear over the stemming tube as the same is moved toward the splitting station.

4. In combination with a machine for the preparing of pears comprising a rotatable turret having disposed thereabout a plurality of stemming and peeling heads vertically aligned with a coring station, and having means for impaling the calyx end of a pear from above, means for supporting said pear during said impaling and during peeling, comprising a sharpened stemming tube and a collar disposed thereabout for engagement with the stem end of a pear, forming part of a stemming tube assembly, housing means for said stemming tube comprising a guide tube fixed axially relative to said stemming and peeling head and slidably surrounding said stemming tube assembly, means including a rack adapted to cooperate with a toothed sector for displacing said stemming tube vertically, means including a friction release assembly for freeing said collar relative to said stemming tube to permit the latter to be inserted as far as desired into a pear while the former remains in contact with the stem end thereof, means for elevating said assembly and said pear from a peeling station through a splitting station to a coring station, including an impaling blade arranged for insertion into the calyx end of the pear, an upper stemming tube and a splitting blade associated with said impaling blade and arranged to remove the calyx end stem fibers and to split said pear as said pear is drawn thereover toward said coring station.

5. A stemming tube assembly arranged for slidable mounting in a guide tube disposed centrally of a pear peeling head, comprising a cylindrical head assembly, and a cylindrical sector assembly, and a cylindrical coupling member joining said head and sector assemblies, a pear-supporting collar having a sleeve slidably disposed within said head assembly and extending upwardly therefrom, a ribbon fixed to said sleeve within said head assembly, a bushing formed at the lower end of said head assembly, a groove cut in said bushing for the passage of said ribbon, a recessed seat formed longitudinally in sector assembly to receive said ribbon, a stemming tube comprising a removable sharpened cutting element threadably connected to said cylindrical coupling member above said head assembly, an ejector assembly comprising an ejecting plug slidably disposed within said stemming tube, and a water bearing shaft extending throughout the length of said stemming tube assembly and connected to said ejecting plug, water passages formed in said ejecting plug, a center-bored roller shaft threadably joined to said shaft at the lower end of said sector assembly, a roller disposed thereon, means for injecting water therethrough into said water-bearing shaft, and a spring disposed about said water-bearing shaft within said sector assembly arranged to urge said ejecting assembly normally downward, a friction release assembly secured to said sector assembly and arranged to fix the position of said ribbon and supporting collar, and a camming surface disposed parallel to said assembly and in engagement with said friction release assembly arranged to unlock said supporting collar relative to said stemming tube when said stemming assembly is traversed downwardly by said sector.

6. A method of preparing pears for use which includes supporting a pear with its stem end downward squaring off the stem end, inserting a coring tube about the stem fibres from beneath, inserting an impaling blade from above into the calyx of the pear, peeling said pear, grasping said pear firmly on both sides of said impaling blade, drawing said pear in the direction of its longitudinal axis over a splitting blade to halve the pear, holding the separated halves of said pears in their original alignment on opposite sides of a splitting plate, coring and peeling the calyx end of said pear, and releasing the separated halves.

7. In a pear preparing machine having a splitting and coring plate, means for splitting a pear and coring the upper portion thereof, comprising a bracket, a roller rotatably fixed to said bracket and traveling in an impaling cam track formed circumferentially about the main turret of said pear preparing machine, a splitting blade fixed to said bracket, a bifurcated impaling blade extending downwardly from said splitting blade, a coring tube disposed centrally of said bifurcated blade and extending upwardly through said splitting blade, a clearing plunger slidably disposed within said coring tube, an ejecting plug threadably engaged with said clearing plunger, means for limiting the upward traveling of said plunger relative to said coring tube, said impaling and splitting blades being arranged to pass through and separate into pear halves as it is drawn thereover, and said stemming tube being adapted to cut out a plug containing the upper portion of the stem fibres and to eject said cut-out plug by engagement of the upper end of said plunger with the lower portion of said splitting plate as the splitting blade is traversing upwardly into contact therewith by clamping fingers associated with the said pear preparing machine.

8. A coring unit, comprising a casing, gears suitably journaled in said casing, a splitting plate fixed to said casing, shafts extending from said casing and fixed separately to said gears, and coring and calyx end peeling knives fixed to said shafts and arranged to be reciprocally rotated thereby through 180° arcs, means for supporting a pear to be cored and peeled upon the splitting plate, and means for driving the shafts to core the pear and peel the calyx end thereof.

9. In a pear preparing machine, a coring head unit, comprising a supporting casing, a drive shaft rotatably journaled in said casing, a wide gear pinion and a narrow gear pinion fixed to said shaft, a tubular shafted driven pinion journaled in said casing and engaging said narrow pinion, a splitting plate secured to said housing, journals formed at the bottom of said plate, a pair of driven shafts journaled in said casing and in said splitting plate journals, pinions secured to said shafts and engaging said wide pinion, calyx end peeling knives fixed to said tubular gear shaft, and coring blades fixed to said parallel shafts.

10. A coring unit for use in the preparation of pears, comprising a supporting casing, a splitting blade fixed vertically therebeneath, a shaft journaled in said casing having a wide-toothed pinion and a narrow-toothed pinion formed thereon, a tubular shaft journaled in said casing, a driven gear formed on said tubular shaft and enmeshed with said narrow pinion, a yoke fixed about said tubular shaft externally of said casing, peeling blades fixed to said yoke, parallel shafts journaled in said casing and extending through said tubular shaft, journals fixed at the bottom of said splitting blade and arranged to receive the lower end of said parallel shafts, pinions fixed to said shafts and enmeshed with said wide pinion, and coring blades fixed to each of said parallel shafts.

11. A coring unit for use in the preparation of pears, comprising a supporting casing, a bottom closure plate fixed to said casing, an apertured splitting plate fixed vertically therebeneath, a driving shaft journaled in said casing and said closure plate, a wide-toothed pinion and a narrow-toothed pinion formed on said driving shaft pinion, a tubular shaft journaled in said bottom closure plate, a pinion formed on said tubular shaft and engaging said narrow-toothed drive pinion, a supporting yoke fixed to said tubular shaft and arranged to rotate within said splitting blade aperture, calyx end peeling blades fixed to said yoke, coring shaft journals formed on either side of said plate centrally of the bottom thereof, coring shafts having their bottom ends rotatably inserted in said journals, arcuately slotted pinions fixed to the upper ends of said parallel shafts and enmeshed with said wide-toothed driving pinion, top journals formed in said casing and arranged to receive the upper end of said parallel shafts, and coring blades fixed to said shafts and arranged to rotate within the apertured portion of said splitting blade.

12. A coring unit for use in the preparation of pears, comprising a gear casing having a bottom closure plate fixed thereto, a splitting blade fixed vertically to said bottom closure plate, a driving shaft journaled in said closure plate and in said casing, a wide-toothed pinion and a narrow-toothed pinion fixed on said shaft, a tubular-shafted driven pinion journaled in said bottom closure plate and enmeshed with said narrow pinion, a yoke fixed to said tubular shaft portion, peeling blades fixed to said yoke and arranged to be rotated within said splitting plate aperture by said driving pinion, peeling blades fixed to the outer ends of said yoke and positioned to peel the calyx end of the pear when rotated, a pair of journals disposed on opposite sides and at the bottom of said splitting plate, coring shafts parallelly disposed within said tubular shafted pinion and set rotatably at their bottom ends in said journals, a half-elliptical coring blade fixed to each of said coring blade shafts, a journal secured to said splitting plate and disposed about said coring blade shafts within the arc of said coring blades; an attachment arm extending normal to the axis of each of said coring blade shafts at the upper end thereof, a connecting stud extending axially of said shaft above each of said connecting arms, an arcuately apertured pinion having a pinion shaft extending vertically upward therefrom and bored to receive said connecting stud, means for securing one of said apertured gears to each of said coring blade shafts in axial alignment therewith, journals formed in the top portion of said gear casing to receive each of said pinion shafts and a pinion shaft closure plate fixed to said gear casing and covering said pinion shaft journals.

13. In a pear preparation machine, a stemming tube upon which a pear is impaled, an impaling blade having a guide tube formed axially thereof, and means for passing the pear from the stemming tube over the impaling blade with the guide tube guiding the pear along the stemming tube path formed in the pear.

14. In a pear preparation machine, a stemming tube upon which a pear is impaled, an impaling blade having a guide tube formed axially thereof, means for passing the pear from the stemming tube over the impaling blade with the guide tube guiding the pear along the stemming tube path formed in the pear, and a plug ejector carried by the guide tube to eject a pear plug therefrom.

15. In combination in a pear preparation machine, of an assembly of blades including a splitting blade and an impaling blade, means for supporting said blades so that they are relatively movable in the plane of their blade sections, the blades each having guide tubes formed thereon to guide the pears along their stem axes, and means for successively moving the pears over the said blades as they are guided within their stem axes by the guide tubes, and a pear core ejector mounted in one of the guide tubes.

GUY A. DUNN.

REFERENCES CITED

The following references are of record in the file of this patent:

UNITED STATES PATENTS

| Number | Name | Date |
| --- | --- | --- |
| 2,187,075 | Coons | Jan. 16, 1940 |
| 2,139,704 | Thompson et al. | Dec. 13, 1938 |
| 1,950,718 | Ducan | Mar. 13, 1934 |
| 2,056,413 | Thompson | Oct. 6, 1936 |
| 2,335,620 | Thompson | Nov. 30, 1943 |